United States Patent [19]

Serizawa et al.

[11] Patent Number: 5,409,763

[45] Date of Patent: Apr. 25, 1995

[54] LONG-FIBER-REINFORCED POLYOLEFIN RESIN STRUCTURE AND ARTICLE MOLDED THEREFROM

[75] Inventors: Hajime Serizawa; Haruji Murakami, both of Shizuoka, Japan

[73] Assignee: Polyplastics Co., Ltd., Japan

[21] Appl. No.: 246,669

[22] Filed: May 20, 1994

[51] Int. Cl.$^6$ .......................... D04H 1/04; C08K 3/40
[52] U.S. Cl. .................................. 428/220; 428/294; 524/494
[58] Field of Search ................. 428/220, 294; 524/494

[56] References Cited

U.S. PATENT DOCUMENTS

| | | | |
|---|---|---|---|
| 4,500,603 | 2/1985 | Freundlich | 428/294 |
| 5,068,142 | 11/1991 | Nose et al. | 428/294 |
| 5,137,766 | 8/1992 | Mazanek et al. | 428/294 |
| 5,275,877 | 1/1994 | Isayev | 428/294 |

*Primary Examiner*—Morton Foelak
*Attorney, Agent, or Firm*—Nixon & Vanderhye

[57] ABSTRACT

To provide a molded thermoplastic resin article which is composed mainly of a long-fiber-reinforced polyolefin resin and which is excellent in impact strength and exhibits a high thermal deformation temperature.

An article molded from a rodlike structure of a long-fiber-reinforced polyolefin resin having a length of 3 mm or above which is prepared by blending a resin component comprising (A) a polyolefin resin and (B) a polyamide resin with (C) a fibrous reinforcement and in which the fibrous reinforcement (C) has a length substantially equal to that of the structure and is arranged substantially in parallel in the lengthwise direction of the structure, wherein the fibrous reinforcement (C) is dispersed in a state enclosed in the polyamide resin (B) in a weight-average fiber length of 1 mm or above and the polyolefin resin (A) and the polyamide resin (B) interpenetrate each other to form a network dispersion.

4 Claims, No Drawings

LONG-FIBER-REINFORCED POLYOLEFIN RESIN STRUCTURE AND ARTICLE MOLDED THEREFROM

FIELD OF THE INVENTION

This invention relates to a polyolefin resin structure which is reinforced with long fibers and an article molded therefrom. More particularly, it relates to a molded thermoplastic resin article which is excellent in impact strength and has a high heat deformation temperature (HDT).

DESCRIPTION OF THE RELATED ART

Polyolefin resins, typical examples of which include polyethylene and polypropylene, are thermoplastic resins which are inexpensive, lightweight and excellent in moldability and chemical resistance. Therefore they have been widely used in, for example, general household goods, automotive parts, electrical parts and electronic parts. However, polyolefin resins are generally poor in heat resistance (heat deformation temperature) and mechanical properties, which makes them unsuitable in the fields with a need for a high heat resistance and a high mechanical strength.

On the other hand, there has been known a means for improving the strength of a polyolefin resin which comprises blending a fibrous reinforcement such as glass fiber with the polyolefin resin. In general, a fiber-reinforced polyolefin resin composition is produced by mixing a polyolefin resin with short fibers such as chopped strands and then extruding the mixture with an extruder. However this method inevitably suffers from the fiber breakage in the course of milling in the extruder. Therefore this method cannot satisfy a demand for, for example, higher mechanical strengths.

On the other hand, it has been examined in recent years to reinforce a polyolefin resin with long fibers as a means for fully utilizing the inherent performance of a fibrous reinforcement to be blended with the polyolefin resin. Such a long-fiber-reinforced polyolefin resin structure can be obtained by, for example, dipping continuous reinforcing fibers, which are under take-off, in an emulsion or a solution of a polyolefin resin or a molten polyolefin resin. Compared with the short-fiber-reinforced polyolefin resin as described above, the long-fiber-reinforced polyolefin resin thus obtained is excellent in mechanical properties, particularly impact strength.

Although a higher impact strength is required in the fields of automobiles or the like, the conventional long-fiber-reinforced polyolefin resins cannot satisfy this requirement. As a means for further improving the impact strength, it is possible to blend another thermoplastic resin excellent in impact strength with a long-fiber-reinforced polyolefin resin. However, no product having practically usable mechanical properties can be obtained by simply blending the polyolefin resin with another resin. This is seemingly attributable to the low dispersibility of these resins with each other.

SUMMARY OF THE INVENTION

Under these circumstances, the present inventors have conducted extensive studies in order to improve the impact strength and heat deformation temperature of a fiber-reinforced polyolefin resin and thus completed the present invention.

Accordingly, the present invention relates to a rod-like, long-fiber-reinforced polyolefin resin structure having a length of 3 mm or above, which is prepared by blending 100 parts by weight of a resin component comprising (A) 99 to 50 parts by weight of a polyolefin resin and
(B) 1 to 50 parts by weight of a polyamide resin with
(C) 10 to 200 parts by weight of a fibrous reinforcement, and in which the fibrous reinforcement (C) has a length substantially equal to that of the structure and is arranged substantially in parallel in the lengthwise direction of the structure, and an article molded from such a rodlike, long-fiber-reinforced polyolefin resin structure as described above wherein the fibrous reinforcement (C) is dispersed in a state enclosed in the polyamide resin (B) in a weight-average fiber length of 1 mm or above and the polyolefin resin (A) and the polyamide resin (B) interpenetrate each other to form a network dispersion.

The present invention is characterized by using a polyamide resin as a resin which is superior to a polyolefin resin in toughness and intermediate between a polyolefin resin and a fibrous reinforcement such as glass fiber in surface tension, producing a rodlike structure of a specified shape by melt milling the polyolefin resin with the polyamide resin and dipping a fibrous reinforcement therein, and molding the rodlike structure to thereby give a molded article having an extremely high impact strength wherein the polyamide resin encloses the fibrous reinforcement therein and mutually forms a continuous structure (a network structure) together with the polyolefin resin, the formation of the continuous structure being further promoted with a longer fiber length.

DETAILED DESCRIPTION OF THE INVENTION

Now the components to be used in the present invention will be described in greater detail.

As widely known, the polyolefin resin to be used in the present invention as the component (A) can be obtained by addition-polymerizing an $\alpha$-olefin hydrocarbon compound such as ethylene or propylene with the use of an appropriate catalyst. Each of these polyolefin resins can be used herein. As examples of the polyolefin resin, polyolefin homopolymers such as high-density polyethylene, medium-density polyethylene, low-density polyethylene, polypropylene and polymethylpentene and copolymers comprising these polymers as a main component may be cited. Regarding the copolymers, however, those which comprise 20% by weight or less of comonomer components other than the olefin may be cited as preferable ones. Also, those having a branched structure may be used as the component (A). The degree of polymerization and the degree of branching thereof are not particularly restricted, so long as the polyolefin resin has moldability. Also, a mixture comprising two or more polyolefin resins may be used therefor.

As the polyamide resin to be used as the component (B) in the present invention, various polyamide resins widely known in the art may be cited. Examples thereof include polyamide resins obtained by polycondensing a dicarboxylic acid such as oxalic acid, adipic acid, suberic acid, sebacic acid, terephthalic acid, isophthalic acid or 1,4-cyclohexyldicarboxylic acid with a diamine such as ethylenediamine, pentamethylenediamine, hexamethylenediamine, decamethylenediamine, 1,4-cyclohexyldiamine or m-xylenediamine; polyamide resins obtained by polymerizing a cyclic lactam such as caprolactam or laurolactam; and polyamide resins obtained by copolymerizing a cyclic lactam and a salt of a dicarboxylic acid with a diamine. Among these polyamide resins, nylon 6, nylon 66 and copolymers thereof may be cited as preferable ones. These polyamide resins (nylon 6 etc.) have a heat deformation temperature higher than that of the polyolefin resin and thus achieve the effect of elevating the heat deformation temperature in addition to the effect of improving the impact strength.

It is required in the present invention that the amount of the polyolefin resin (A) range from 99 to 50 (by weight) and the amount of the polyamide resin (B) range from 1 to 50%, when the sum total of the components (A) and (B) is 100%.

When the content of the polyamide resin in the resin component is smaller than 1%, no effect of improving the impact strength can be achieved. When this content exceeds 50%, on the other hand, there sometimes arises a problem that the dimensional change is increased due to water absorption.

The fibrous reinforcement (C) to be used in the present invention is not particularly restricted. For example, fibers having a high melting point (a high softening point) such as glass fiber, carbon fiber, metal fiber and aromatic polyamide fiber may be used therefor. In the case of glass fiber, fiber bundles having a fibrous diameter of 6 to 25 μm and weighing 500 to 4400 g per 1000 m are generally used. These fibers may be those pretreated with publicly known surface treatments.

The reinforcing fiber bundles to be used in the present invention are these which are prepared by treating a number of filaments taken off from a bushing with an aqueous solution or an aqueous emulsion of a sizing agent and then bundling. More particularly, wound fiber bundles formed by bundling and wind-drying into cylinders (so-called direct roving packages) and wound fiber bundles formed by wind-drying into a substantially endless shape (so-called cake packages) may be cited therefor.

In the present invention, the amount of the reinforcement selected from among these fibers ranges from 10 to 200 parts by weight per 100 parts by weight of the resin component. When the amount of the fibrous reinforcement is smaller than 10 parts by weight, only a small reinforcing effect is established by the fiber. When the amount thereof exceeds 200 parts by weight, on the contrary, the preparation of the composition structure per se becomes difficult or the processability of an article molded therefrom are considerably deteriorated. In this case, furthermore, it can be scarcely expected that any improvement in impact strength accompanies the increase in the content of the fiber. When the balance of the reinforcing effect with the processability, etc., is taken into consideration, the amount of the fiber preferably ranges from 15 to 200 parts by weight, still preferably from 20 to 150 parts by weight.

Although the modified polyolefin to be used as the component (D) is not an essential component, it is preferably employed since it has functional group(s) with a high affinity for the polyamide resin and thus the affinity of the component (A) for the component (B) is elevated and the capability of forming the network structure is improved thereby. The modified polyolefin to be used herein as the component (D) means a modified olefin polymer having at least one group selected from among various carboxyl, carboxylic anhydride, metal carboxylate, carboxylic ester, imino, amino and epoxy groups. Examples thereof include modified polyolefin copolymers or graft copolymers prepared by chemically introducing maleic anhydride, succinic anhydride, iraconic anhydride, citraconic anhydride, N-phenylmaleimide, N-cyclohexylmaleimide, glycidyl acrylate, glycidyl methacrylate, glycidyl vinylbenzoate, N-[4-(2,3-epoxypropoxy)-3,5-dimethylbenzyl]acrylamide (AXE), alkyl methacrylates and/or derivatives thereof into polyolefins such as polypropylene, polyethylene or ethylene/propylene copolymer and polyamide-grafted polyolefins comprising a polyolefin and a polyamide. As particularly preferable examples of the component (D), modified polyolefins such as maleic anhydride-modified polyethylene, maleic anhydride-modified polypropylene, ethylene/propylene/maleic anhydride copolymer, succinic anhydride-modified polyethylene, itaconic anhydride-modified polyethylene, glycidyl methacrylate-modified polyethylene, glycidyl methacrylate-modified polypropylene, AXE-modified polyethylene, AXE-modified polypropylene and polyamide-grafted polyolefins may be cited. The component (D) is not restricted in, for example, the degree of polymerization. It may be an oligomer having no moldability per se.

The amount of the component (D) preferably ranges from to 50% by weight based on the sum total of the components (A) and (D). When its content is smaller than 1% by weight, the above-mentioned effect cannot be exerted. When its content exceeds 50% by weight, on the other hand, the melt viscosity of the composition is elevated, which sometimes brings about some problems in the moldability thereof.

A structure containing fibers which are continuous and arranged substantially in parallel therein refers to a rodlike, straplike, tapelike or sheetlike structure or an elongated structure. In particular, a rodlike structure, which can be obtained by coating the surface of a filament (i.e., the constituting unit of the fiber bundles) continuously arranged in parallel with a thermoplastic resin to thereby give a strand and then cutting it into a given size, is a preferable one.

As examples of the method for coating the filament with the thermoplastic resin, the dip coating method comprising dipping fiber bundles in a thermoplastic resin in a molten state and another method comprising dipping fiber bundles in a powdery thermoplastic resin which is floating in the atmosphere or suspended in a liquid such as water and then melting to thereby give strand may be cited. The dip coating method is not particularly restricted and any publicly known method, for example, those comprising passing fiber bundles through a flat die (see JP-A No. 63-216732) or a bent passage (see JP-A No. 63-264326) or using a roller (see JP-A 63-132036) or a belt (see JP-A No.1-214408) may be employed therefor. From the viewpoint of workability, it is particularly preferable to select the pultrusion method wherein fiber bundles are passed through a flat die or a dipping die provided with a bent passage therefor. Further, the fiber bundles thus dipped in the thermoplastic resin may be subsequently passed through a shaping die and thus formulated into a strand of a desired shape.

The strands thus obtained are cut into the desired length in a direction almost perpendicular to the fiber. Thus a resin structure can be obtained. For the purpose of molding, the resin structure thus obtained is preferably formulated into rods of at least 3 mm, preferably from 3 to 100 mm, in length. In this case, the fibrous reinforcement (C) has a length substantially equal to that of the structure and is arranged substantially in parallel in the lengthwise direction of the structure.

The polyolefin resin structure of the present invention may contain publicly known additives, for example, lubricants, slip additives, nucleating agents, dyes, pigments, mold releasing agents, antioxidants, heat stabilizers, weather (light) stabilizers, reinforcements, hydrolyric stabilizers, thermoplastic resins other than the components (A), (B) and (D) and fillers other than the component (C) in small amounts to thereby impart desired properties thereto, so long as the objects of the present invention are not deteriorated thereby.

In the present invention, the components can be melt milled by using a mill such as a kneader or an extruder. It is particularly preferable to effect the melt milling with the use of a twin-screw or single-screw extruder.

The treating temperature is adjusted to a level higher than the melting temperature of the resin component by 5 to 100° C., preferably by 10° to 60° C. An excessively high treating temperature is not preferable, since decomposition or abnormal reactions might occur in such a case.

The melt milling is completed within 30 seconds to 15 minutes, preferably 1 to 10 minutes.

An article molded from the long-fiber-reinforced polyolefin resin structure of the present invention is excellent in impact strength and has a high heat deformation temperature. This it can be suitably employed in various industrial fields where these characteristics are required.

EXAMPLES

To further illustrate the present invention in greater detail, and not by way of limitation, the following Examples will be given.

EXAMPLES 1 TO 8

The rodlike structure of the long-fiber-reinforced polyolefin resin employed in each of these Examples was the one produced in accordance with the method described in JP-A No. 3-230943. More particularly speaking, a roving of glass fiber bundles was heated under continuous taking off and then passed through a crosshead die. Into the crosshead die were fed a polypropylene resin (Noblen AX574 mfd. by Sumitomo Chemical Co., Ltd.), nylon 66 (Nylon 2015B mfd. by Ube Industries, Ltd.) and a modified polypropylene, which had been melt milled in an extruder, in a molten state at a ratio as specified in Table 1. Thus the glass roving was dipped in the molten resin in the crosshead die. In this step, the glass content was adjusted to 40% by weight by controlling the take-off speed of the glass roving and the feed rate of the molten polypropylene.

The polypropylene-containing glass fiber roving (strands) emerging from the crosshead die was then passed successively through a shaping die and a take-off roll. Then the strands were cut with a pelletizer so as to give a rodlike structure of 6 mm in length.

This rodlike structure was molded into test pieces and the Izod impact strength, face impact strength and heat deformation temperature thereof were measured by the following methods.

Further, the resin component of the test piece was subjected to combustion in an electric oven at 600° C. Then the length of the residual glass fibers was measured and thus the weight-average fiber length was determined. Furthermore, the test piece was treated with hot xylene by the following method and the shape of the treated test piece was observed. Table 1 summarizes the results.

Treatment with Hot Xylene

A molded piece (10×10×3 mm) was introduced into a solution of xylene and heated on an oil bath at 120° C. for 5 hours to thereby elute the polyolefin resin (A), i.e., the matrix resin, and the modified polyolefin (D). Subsequently, a change in the shape of the test piece was observed with the naked eye.

After such a treatment, a molded test piece having the polyamide resin (B) dispersed therein in the form of grains could not retain its shape. In contrast thereto, it was observed that the molded piece of the present invention, wherein the polyamide resin (B) enclosed the glass fibers therein and formed a network structure, retained its shape.

Izod impact strength: Measurement was made in accordance with the method of ASTM D256.
Face impact strength: Measurement was made in accordance with the method of JIS K-7211.
Heat deformation temperature: Measurement was made in accordance with the method of ASTM D648 under a load of 18.6 kg.

COMPARATIVE EXAMPLE 1

A sample containing no polyamide resin (B) was evaluated in the same manner. The results are also given in Table 1.

EXAMPLES 9 TO 12 AND COMPARATIVE EXAMPLES 2 AND 3

Molded pieces were prepared in the same manner as those of Examples 1 to 8 except that the components and the ratio were varied as shown in Table 2, followed by the evaluation. Table 2 summarizes the results.

EXAMPLES 13 TO 18

Molded pieces were prepared in the same manner as those of Examples 1 to 8 except that the components and the ratio were varied as shown in Table 3, followed by the evaluation. Table 3 summarizes the results.

TABLE 1

| | | Unit | Comp. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| (A) | polypropylene | pt. by wt. | 100 | 90 | 80 | 80 | 70 | 60 | 70 | 60 | 40 |
| (B) | nylon 66 | do. | — | 10 | 10 | 20 | 20 | 20 | 20 | 40 | 40 |
| (C) | glass fiber | do. | 67 | 67 | 67 | 67 | 67 | 67 | 67 | 67 | 67 |
| (D) | maleic anhydride-modified polypropylene | do. | — | — | 10 | — | 10 | 20 | — | — | 20 |
| (D) | epoxy-modified polypropylene | do. | — | — | — | — | — | — | 10 | — | — |
| | after treating with | — | no shape | partial | shape | partial | shape | shape | shape | partial | shape |

TABLE 1-continued

|  | Unit | Comp. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| hot xylene |  | retention | shape retention | retention | shape retention | retention | retention | retention | shape retention | retention |
| glass fiber length of test piece | mm | 3.1 | 2.9 | 2.9 | 2.8 | 2.7 | 2.7 | 2.7 | 2.5 | 2.4 |
| Izod impact strength | kg/cm$^2$ | 34.5 | 36.3 | 36.5 | 36.8 | 37.0 | 37.2 | 36.9 | 37.9 | 38.2 |
| fact impact strength | kgf · mm | 44 | 51 | 56 | 57 | 64 | 67 | 55 | 70 | 76 |
| heat deformation temp. | °C. | 159 | 166 | 169 | 176 | 185 | 186 | 185 | 199 | 209 |

TABLE 2

|  |  | Unit | Comp. Ex. 2 | Ex. 9 | Ex. 10 | Comp. Ex. 1 | Ex. 3 | Ex. 4 | Comp. Ex. 3 | Ex. 11 | Ex. 12 |
|---|---|---|---|---|---|---|---|---|---|---|---|
| (A) | polypropylene | pt. by wt. | 100 | 80 | 70 | 100 | 80 | 70 | 100 | 80 | 70 |
| (B) | nylon 66 | do. | — | 20 | 20 | — | 20 | 20 | — | 20 | 20 |
| (C) | glass fiber | do. | 25 | 25 | 25 | 67 | 67 | 67 | 100 | 100 | 100 |
| (D) | maleic anhydride-modified polypropylene | do. | — | — | 10 | — | — | 10 | — | — | 10 |
| after treating with hot xylene |  | — | no shape retention | partial shape retention | shape retention | shape retention | partial shape retention | shape retention | no shape retention | partial shape retention | shape retention |
| glass fiber length of test piece | | mm | 3.2 | 2.9 | 2.9 | 3.1 | 2.8 | 2.7 | 2.8 | 2.5 | 2.4 |
| Izod impact strength | | kg/cm$^2$ | 28.1 | 30.0 | 30.5 | 34.5 | 36.8 | 37.0 | 40.0 | 40.8 | 41.5 |
| fact impact strength | | kgf · mm | 25 | 33 | 38 | 44 | 57 | 64 | 60 | 77 | 82 |
| heat deformation temp. | | °C. | 159 | 172 | 174 | 159 | 176 | 185 | 160 | 180 | 189 |

TABLE 3

|  |  | Unit | Comp. Ex. 2 | Ex. 13 | Ex. 14 | Ex. 15 | Comp. Ex. 1 | Ex. 16 | Ex. 17 | Ex. 18 |
|---|---|---|---|---|---|---|---|---|---|---|
| (A) | polypropylene | pt. by wt. | 100 | 80 | 70 | 70 | 100 | 80 | 70 | 70 |
| (B) | nylon 66 | do. | — | 20 | 20 | 20 | — | 20 | 20 | 20 |
| (C) | glass fiber | do. | 25 | 25 | 25 | 25 | 67 | 67 | 67 | 67 |
| (D) | maleic anhydride-modified polypropylene | do. | — | — | 10 | — | — | — | 10 | — |
| (D) | epoxy-modified polypropylene | do. | — | — | — | 10 | — | — | — | 10 |
| after treating with hot xylene | | — | no shape retention | partial shape retention | shape retention | shape retention | no shape retention | partial shape retention | shape retention | shape retention |
| glass fiber length of test piece | | mm | 3.2 | 2.9 | 2.9 | 2.9 | 3.1 | 2.8 | 2.7 | 2.7 |
| Izod impact strength | | kg/cm$^2$ | 28.1 | 30.4 | 30.8 | 30.7 | 34.5 | 37.0 | 37.4 | 37.3 |
| fact impact strength | | kgf · mm | 25 | 35 | 41 | 38 | 44 | 58 | 67 | 66 |
| heat deformation temp. | | °C. | 159 | 162 | 167 | 166 | 159 | 165 | 169 | 168 |

What we claim is:

1. A long-fiber-reinforced polyolefin resin structure having a length of 3 mm or above, which is prepared by blending 100 parts by weight of a resin component comprising (A) 99 to 50 parts by weight of a polyolefin resin and
(B) 1 to 50 parts by weight of a polyamide resin with
(C) 10 to 200 parts by weight of a fibrous reinforcement, and in which the fibrous reinforcement (C) has a length substantially equal to that of the structure and is arranged substantially in parallel in the lengthwise direction of the structure.

2. A long-fiber-reinforced polyolefin resin structure as set forth in claim 1, which further contains (D) a modified polyolefin having at least one group selected from among carboxyl, carboxylic anhydride, metal carboxylate, carboxylic ester, imino, amino and epoxy groups in an amount of 1 to 50% by weight based on the sum total of the components (A) and (D).

3. A long-fiber-reinforced polyolefin resin structure as set forth in claim 1, which has a length of 3 to 100 mm.

4. An article molded from the long-fiber-reinforced polyolefin resin structure as set forth in claim 1, wherein the fibrous reinforcement (C) is dispersed in a state enclosed in the polyamide resin (B) in a weight-average fiber length of 1 mm or above and the polyolefin resin (A) and the polyamide resin (B) interpenetrate each other to form a network dispersion.

* * * * *

UNITED STATES PATENT AND TRADEMARK OFFICE
CERTIFICATE OF CORRECTION

PATENT NO. : 5,409,763
DATED : April 25, 1995
INVENTOR(S) : SERIZAWA et al

It is certified that error appears in the above-identified patent and that said letters patent is hereby corrected as shown below:

Column 1, line 27, delete "a";
line 36, change "a" to --the--;
line 37, delete ", for example,";
line 39, delete "a"

Column 3, line 35, change "these" to --those--.

Signed and Sealed this

First Day of August, 1995

Attest:

BRUCE LEHMAN

Attesting Officer

Commissioner of Patents and Trademarks